(12) United States Patent
Dube

(10) Patent No.: US 12,353,853 B2
(45) Date of Patent: Jul. 8, 2025

(54) SCALABLE AND CUSTOMIZABLE COMPUTATION USING A MODULARIZED CODE ARCHITECTURE

(71) Applicant: Capital One Services, LLC, McLean, VA (US)

(72) Inventor: Abhishek Dube, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 273 days.

(21) Appl. No.: 18/049,477

(22) Filed: Oct. 25, 2022

(65) Prior Publication Data
US 2024/0134613 A1 Apr. 25, 2024
US 2024/0231768 A9 Jul. 11, 2024

(51) Int. Cl.
*G06F 8/35* (2018.01)
*G06Q 40/02* (2023.01)

(52) U.S. Cl.
CPC .............. *G06F 8/35* (2013.01); *G06Q 40/02* (2013.01)

(58) Field of Classification Search
CPC ................................. G06F 8/35; G06Q 40/02
See application file for complete search history.

(56) References Cited

U.S. PATENT DOCUMENTS 9,147,217 B1 * 9/2015 Zabritski ............... G06Q 40/03
10,755,327 B2 8/2020 Nagla et al.

OTHER PUBLICATIONS

Unknown, Comma-separated values, Mar. 31, 2022, Wikipedia (Year: 2022).*

* cited by examiner

*Primary Examiner* — Scott S Trotter
(74) *Attorney, Agent, or Firm* — Harrity & Harrity, LLP

(57) ABSTRACT

In some implementations, a device may obtain, based on a characteristic associated with an account, a set of forecasted values from a dataset of forecasted values. The set of forecasted values may include forecasted values for a plurality of forecasting metrics for a plurality of time periods. The device may generate, for the account, feature metric values, for the plurality of time periods, for a plurality of feature metrics based on the set of forecasted values. The device may compute, for the account, at least one present or future value metric based on the feature metric values for the plurality of feature metrics.

20 Claims, 8 Drawing Sheets

SCALABLE AND CUSTOMIZABLE COMPUTATION USING A MODULARIZED CODE ARCHITECTURE

BACKGROUND

Modular programming may separate the functionality of an application into independent, interchangeable modules. Each module may include code and/or data used for executing a single aspect of a functionality of the application.

SUMMARY

Some implementations described herein relate to a system for computation using a modularized code architecture. The system may include one or more memories and one or more processors communicatively coupled to the one or more memories. The one or more processors may be configured to obtain an indication of an account for which a value is to be computed. The one or more processors may be configured to select a set of forecasted values, from a dataset of forecasted values, based on a characteristic associated with the account. The set of forecasted values may include forecasted values for a plurality of forecasting metrics for a plurality of time periods. The dataset of forecasted values may be in a first code module. The one or more processors may be configured to generate, for the account and in a plurality of data structures respectively representative of a plurality of feature metrics, feature metric values, for the plurality of time periods, for the plurality of feature metrics based on the set of forecasted values. Function definitions for computation of the plurality of feature metrics may be in a second code module. The plurality of data structures may be configured to store a single data type, and the single data type may be numerical. The one or more processors may be configured to compute, for the account, the value using the feature metric values for the plurality of feature metrics. A function definition for computation of the value may be in a third code module. The one or more processors may be configured to transmit, to a user device, information indicating the value.

Some implementations described herein relate to a method of computation using a modularized code architecture. The method may include obtaining, by a device from a first code module, a set of forecasted values based on a characteristic associated with a plurality of accounts. The set of forecasted values may include forecasted values for a plurality of forecasting metrics for a plurality of time periods. The method may include determining, by the device and using function definitions in a second code module, respectively for each account of the plurality of accounts and using the set of forecasted values, feature metric values, for a plurality of feature metrics, for the plurality of time periods. The method may include determining, by the device and using function definitions in a third code module, respectively for each account of the plurality of accounts, at least one value using the feature metric values, for the plurality of feature metrics, associated with that account. The method may include transmitting, by the device to a user device, information indicating the at least one value that is determined respectively for each account of the plurality of accounts.

Some implementations described herein relate to a non-transitory computer-readable medium that stores a set of instructions for a device. The set of instructions, when executed by one or more processors of the device, may cause the device to obtain, based on a characteristic associated with an account, a set of forecasted values from a dataset of forecasted values. The set of forecasted values may include forecasted values for a plurality of forecasting metrics for a plurality of time periods. The set of instructions, when executed by one or more processors of the device, may cause the device to generate, for the account, feature metric values, for the plurality of time periods, for a plurality of feature metrics based on the set of forecasted values. The set of instructions, when executed by one or more processors of the device, may cause the device to compute, for the account, at least one present or future value metric based on the feature metric values for the plurality of feature metrics.

DETAILED DESCRIPTION

Figure 1A:
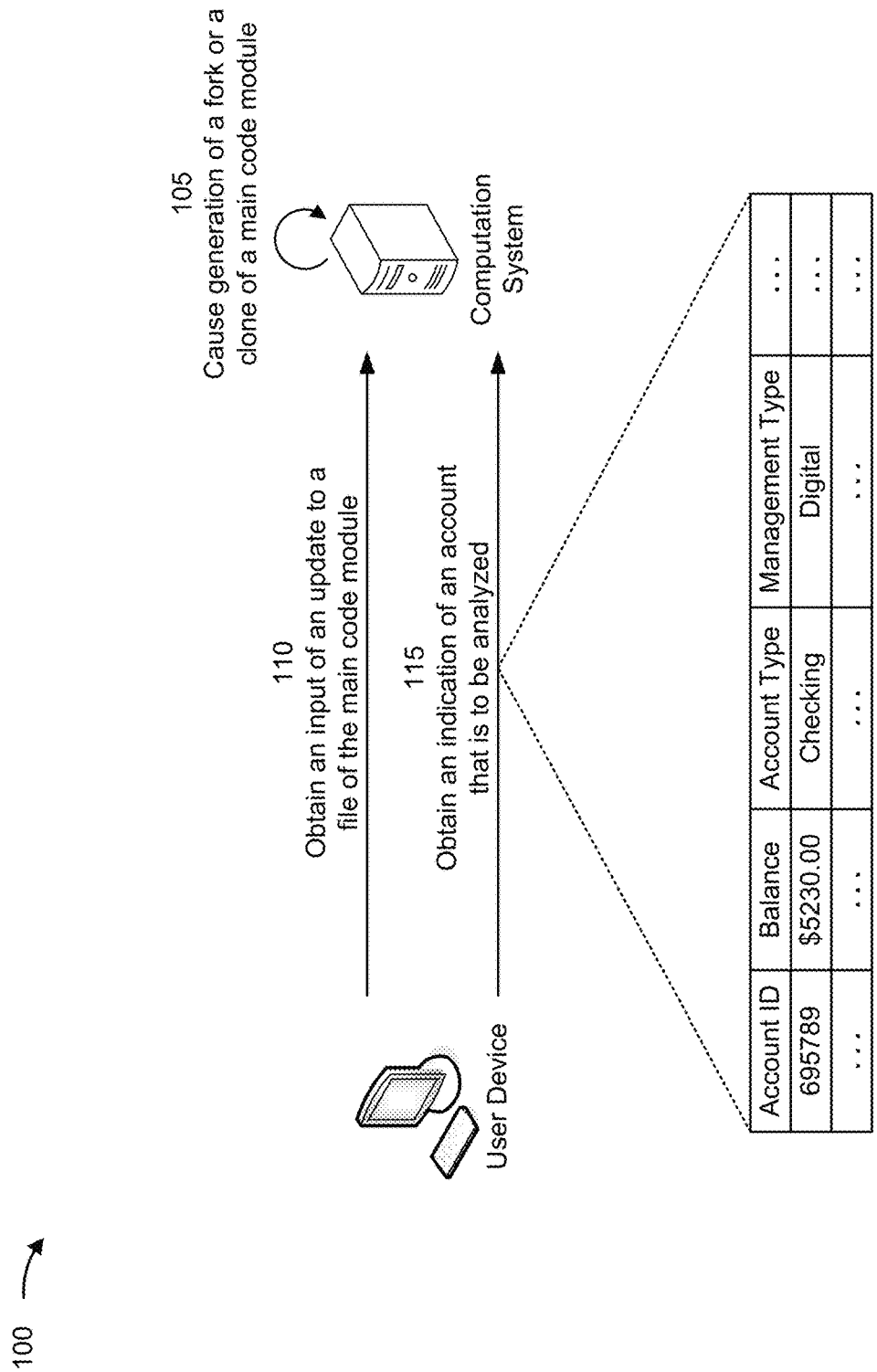
FIGS. 1A-1E are diagrams of an example associated with computation using a modularized code architecture, in accordance with some embodiments of the present disclosure.

The following detailed description of example implementations refers to the accompanying drawings. The same reference numbers in different drawings may identify the same or similar elements.

Implementations described herein provide a modular code architecture that may be interchanged to provide more efficient usage of computing resources (e.g., processor resources, memory resources, or the like). For example, an entity, such as a financial institution, may utilize a system for computing present value metrics and/or future value metrics (referred to herein as "present/future value metrics"), such as a terminal value, a present value, or a net present value (NPV). As an example, the system may compute such metrics for accounts (e.g., savings accounts, checking accounts, or the like) maintained by the entity. In some cases, the entity may maintain thousands or millions of accounts, thereby resulting in the system expending significant computing time and computing resources (e.g., processor resources, memory resources, or the like) toward computation of present/future value metrics for the accounts. Sometimes, such computations may be performed using a spreadsheet application, which may be unable to handle computations for numerous accounts and may be unable to accommodate customizations to underlying data and formulas used for the computations (e.g., because the data and formulas may be referenced from multiple files that may in turn reference, or are referenced by, other files). Moreover, data used in such computations may be stored in indexed arrays, which may be iterated through numerous times for data retrieval, thereby consuming excessive computing resources (e.g., processor resources, memory resources, or the like).

Some implementations described herein provide a computation system capable of computation of present/future value metrics for one or more accounts with improved speed and scalability. The computation system may employ a modularized code architecture. For example, a first code module may provide a dataset of forecasted values (e.g., indicating predicted future values, such as at least one month into the future) for a plurality of forecasting metrics relating to accounts (e.g., average balance, average deposit amount, average withdrawal amount, interest rate, attrition, fund transfer pricing, and/or tax, among other examples), a second code module may provide function definitions for computation of feature metric values using forecasted values (e.g., an attrition metric, a balance per open metric, a costs metric, an equity flow metric, a fees metric, and/or a fund transfer pricing metric, among other examples), and a third code module may provide function definitions for computation of present/future value metrics using the feature metric values (e.g., a terminal value, a present value, and/or an NPV, among other examples). A function definition may include code that defines a formula, a computation, or another operation that receives an input (e.g., one or more arguments) and returns an output based on the input. For example, a function definition for computation of NPV may include code that is configured to receive one or more feature metric values, to perform one or more operations on the feature metric values to derive an NPV, and to return the NPV. A feature may be a variable (e.g., a forecasted variable based on forecasted values) that is indicative of a present/future value metric. A feature metric may be a quantifiable expression of a feature.

The modularized code architecture may improve computation speed (e.g., by reducing redundant code and function calls, and reducing iterative computation), facilitate customization of data and functions used for computation of present/future value metrics (e.g., because customizations may be made to code in one module without requiring customization to, or affecting, code in another module), and enable portability of the computation system across various applications.

In some implementations, data generated by the computation system, while performing computation of present/future value metrics, may be arranged in data structures configured to store only numerical data (e.g., non-textual data in a numerical form, such as an integer data type, a decimal data type, or a floating point data type, among other examples). Moreover, the data structures may be configured for storage at one continuous place in a memory of the computation system, thereby improving speed and efficiency at which the data structures can be accessed and manipulated. In this way, the computation system may compute present/future value metrics with improved speed (e.g., present/future value metrics may be computed for an account in less than one second) and with reduced consumption of computing resources (e.g., processor resources, memory resources, or the like), and therefore the computation system may be scaled to handle computations for thousands or millions of accounts.

FIGS. 1A-1E are diagrams of an example 100 associated with computation using a modularized code architecture. As shown in FIGS. 1A-1E, example 100 includes a computation system, and a user device. These devices are described in more detail in connection with FIGS. 2 and 3. In some implementations, the computation system and the user device may be associated with an entity, such as a financial institution that maintains a plurality of accounts (e.g., checking accounts, savings accounts, and/or direct deposit accounts, among other examples) for a plurality of users.

The computation system may use a modularized code architecture to perform operations associated with computation of a present/future value metric. For example, as shown in FIGS. 1A-1E, the modularized code architecture may include a first code module (e.g., a first code repository), a second code module (e.g., a second code repository), and a third code module (e.g., a third code repository). A main code module (e.g., a main code repository) may include the first code module, the second code module, and the third code module. The first code module may include a dataset of forecasted values, as described herein. The second code module may include function definitions for computation of feature metric values, as described herein. The third code module may include function definitions for computation of present/future value metrics, as described herein. In some implementations, the main code module may include an orchestration module (e.g., a code file) configured to execute computation of a present/future value metric by integrating data and functions across the first code module, the second code module, and the third code module.

The modularized code architecture facilitates customization of data and formulas used for computation of a present/future value metric. In this way, the computation system may be easily adapted for use across various applications, thereby reducing the utilization of storage resources and computing resources that otherwise may be used to store and execute redundant data and formulas for the various applications.

As shown in FIG. 1A, and by reference number 105, the computation system may cause generation of a fork or a clone of the main code module. The fork or the clone of the main code module may be a copy of the main code module (e.g., which may be stored at the computation system in the case of the fork, or stored at the user device in the case of the clone). To cause generation of the fork or the clone, the computation system may generate a copy of the main code module, or provide an instruction to another device to generate a copy of the main code module. Code of at least one of the first code module, the second code module, or the third code module may be customizable (e.g., by a user) in the fork or the clone of the main code module (whereas code in the main code module itself may not be customizable).

As shown by reference number 110, the computation system may obtain (e.g., from the user device) an input of an update (e.g., in the fork or the clone of the main code module) to the dataset of forecasted values of the first code module, the function definitions (e.g., for computation of the feature metric values) of the second code module, and/or the function definitions (e.g., for computation of present/future value metrics) of the third code module. For example, the update to the dataset of forecasted values may include an adjustment to one or more of the forecasted values. As another example, the update to the function definitions may include an adjustment to one or more formulas defined by the function definitions (e.g., by adding a variable to a formula, removing a variable from a formula, and/or adjusting a weighting of a variable of a formula). Accordingly, the update may provide a customization to the code of the first code module, the second code module, or the third code module.

As shown by reference number 115, the computation system may obtain (e.g., from the user device) an indication of at least one account that is to be analyzed (e.g., for which a present/future value metric is to be computed). In some implementations, the indication may indicate a single account. In some implementations, the indication may indicate a plurality of accounts. The indication may indicate one or more accounts by account identifiers (e.g., account numbers), by account type (e.g., savings accounts, checking accounts, direct deposit accounts, or the like), and/or by management type (e.g., banker-managed accounts, branch-managed accounts, digitally-managed accounts, or the like).

In some implementations, the indication may indicate information associated with the indicated account(s), such as an account identifier, a balance, an account type, and/or a management type, among other examples. In some implementations, the computation system may obtain (e.g., from a database) the information associated with the indicated account(s). For example, if the indication indicates an account identifier for an account, then the computation system may obtain information indicating a balance of the account, an account type of the account, and/or a management type of the account, among other examples. In some implementations, the computation system may arrange information associated with the account(s) in a standardized data structure, such as an associative array (e.g., a Python dictionary). Here, key values of the associative array may be used to efficiently obtain data from the dataset of forecasted values (e.g., using efficient key-value lookups), as described herein.

Figure 1B:
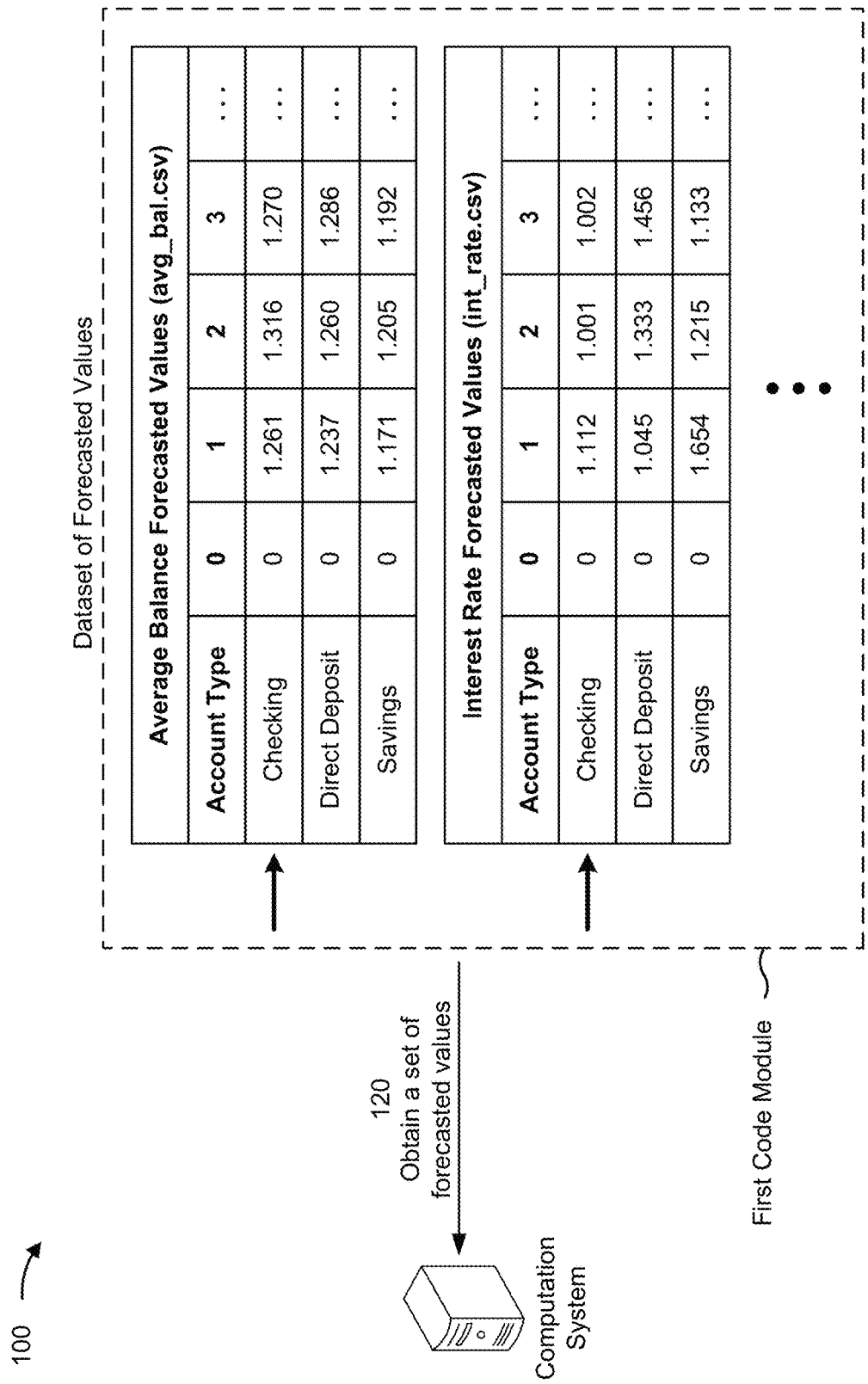

As shown in FIG. 1B, and by reference number 120, the computation system may obtain a set of forecasted values from the dataset of forecasted values. In some implementations, function definitions for obtaining one set of forecasted values from the dataset of forecasted values may be in a fourth code module (e.g., a fourth code repository). For example, the function definitions may define functions for selecting particular values from the dataset of forecasted values, as described herein.

The set of forecasted values may include forecasted values for a plurality of forecasting metrics and for a plurality of time periods (e.g., from 0-99 months, where a quantity of the time periods may be standardized across all data described herein to improve efficiency). For example, the set of forecasted values may include, for a particular forecasting metric, a first forecasted value for a first time period (e.g., month 0), a second forecasted value for a second time period (e.g., month 1), a third forecasted value for a third time period (e.g., month 2), and so forth. The forecasting metrics may include average balance, average deposit amount, average withdrawal amount, interest rate, attrition, fund transfer pricing, and/or tax, among other examples.

In some implementations, the dataset of forecasted values may be based on historical data (e.g., historical data relating to account balances, deposit amounts, withdrawal amounts, or interest rate changes, among other examples). In some implementations, the dataset of forecasted values may be generated, based on the historical data, using one or more forecasting models (e.g., machine learning models). In some implementations, the computation system may generate the forecasted values, based on the historical data, using the forecasting model(s), or the computation system may receive the forecasted values from another device that generated the forecasted values. The forecasted values may be multiplier values (e.g., a product of a multiplier value for month 5 and a starting account balance of an account may give a predicted account balance of the account at month 5).

In some implementations, the dataset of forecasted values may be segmented by one or more account characteristics, such as an account type or a management type. The computation system may obtain the set of forecasted values, from the dataset of forecasted values, based on a characteristic associated with the account(s). That is, the computation system may select the set of forecasted values, from the dataset of forecasted values, based on a characteristic associated with the account(s). The characteristic may be an account type or a management type, among other examples. The account type may be a general account type, such as savings account, checking account, or direct deposit account, among other examples, or a more specific account type, such as a particular type of savings account (e.g., a high yield savings account), a particular type of checking account, or a particular type of direct deposit account, among other examples. The management type may be banker managed, branch managed, or digitally managed, among other examples. Thus, for example, if the account(s) to be analyzed are checking accounts, then the computation system may obtain the set of forecasted values relating to checking accounts, as shown. Accordingly, the set of forecasted values may be applicable to any account associated with the characteristic (e.g., the set of forecasted values may be globally applicable to accounts associated with the characteristic, rather than being account-specific values).

As described herein, the dataset of forecasted values may be in the first code module (e.g., the first code repository). In some implementations, the first code module may include respective data files for a plurality of forecasting metrics. Here, forecasted values, of the set of forecasted values, may be in the respective data files. For example, a first data file (e.g., avg_bal.csv, as shown) may relate to "average balance" forecasted values, and the first data file may include respective forecasted values, over a plurality of time periods, for multiple different characteristics (e.g., for multiple different account types, as shown). Continuing with the example, a second data file (e.g., int_rate.csv, as shown) may relate to "interest rate" forecasted values, and the second data file may include respective forecasted values, over the plurality of time periods, for the multiple different characteristics. Thus, to obtain the set of forecasted values, the computation system may obtain (e.g., select) forecasted values from each of multiple data files in the first code module.

In some implementations, the dataset of forecasted values may be in a tabular structure, such as a comma-separated-value (CSV) format (e.g., the data files in the first code module may be in a CSV format), thereby facilitating customization of the forecasted values (e.g., if one or more forecasted values need adjustment) and/or customization of the segmentation of the forecasted values (e.g., by an account type segment, a management type segment, or one or more other segment types). In some implementations, the dataset of forecasted values may be in a serialization model file (e.g., a Python pickle file) configured to provide serialization and deserialization of the dataset of forecasted values. In some implementations, the computation system may arrange the set of forecasted values in a standardized data structure, such as an associative array (e.g., a Python dictionary), to facilitate efficient data retrieval from the set of forecasted values (e.g., using efficient key-value lookups).

Figure 1C:
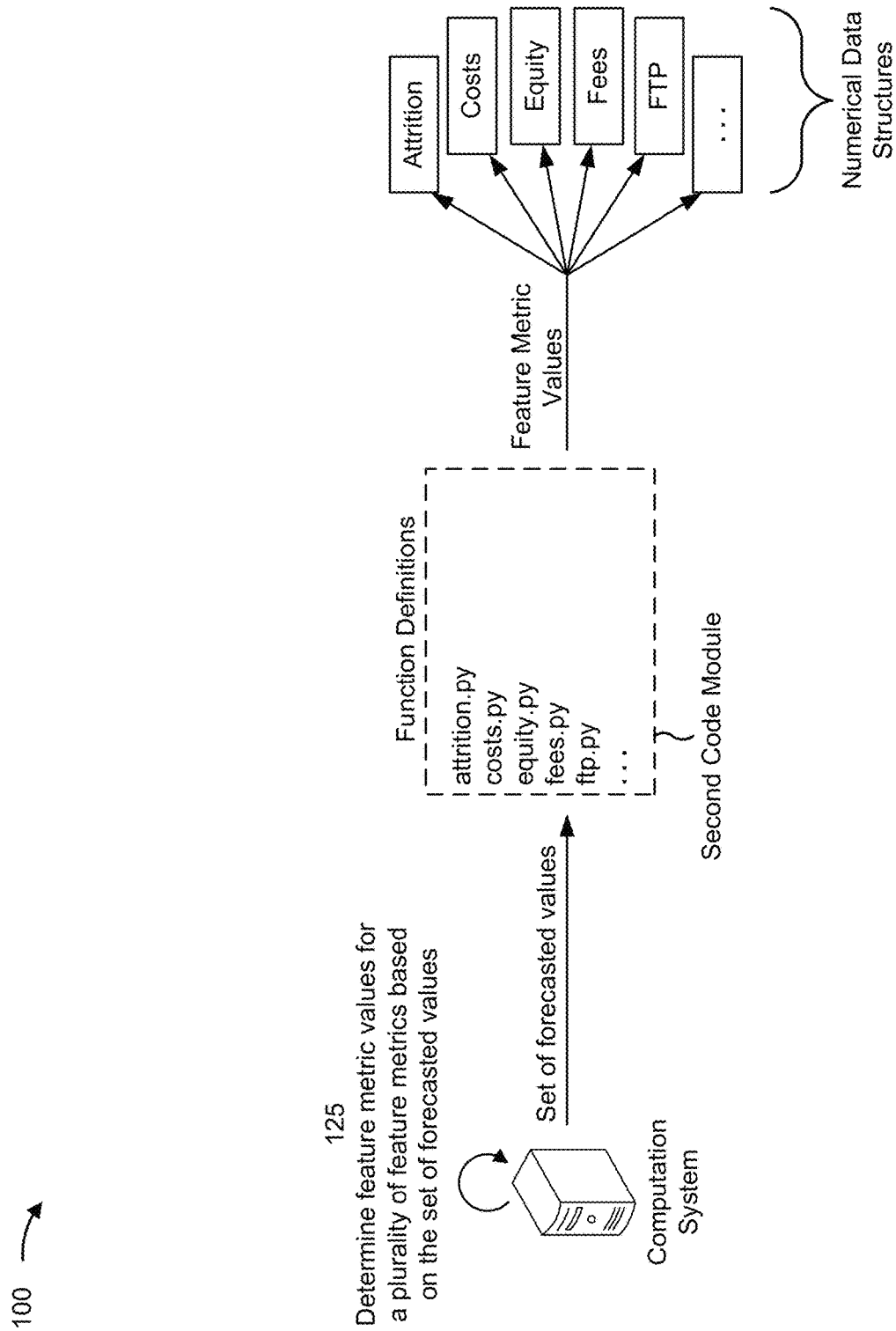

As shown in FIG. 1C, and by reference number 125, the computation system may determine (e.g., generate), respectively for each of the account(s), feature metric values (which may also be referred to as "assumptions"), for a plurality of feature metrics, based on the set of forecasted values. For example, the feature metric values for an account may represent predicted values for the feature metrics. The computation system may determine, respectively for each of the account(s), the feature metric values, for the plurality of feature metrics, for the plurality of time periods. For example, for a particular account, the computation system may determine, for a first feature metric, respective feature metric values for each of the plurality of time periods (e.g., using respective forecasted values corresponding to the plurality of time periods), may determine, for a second feature metric, respective feature metric values for each of the plurality of time periods (e.g., using respective forecasted values corresponding to the plurality of time periods), and so forth. The feature metrics may include an attrition metric, a balance per open metric, a costs metric, an equity flow metric, a fees metric, and/or a fund transfer pricing metric, among other examples.

In some implementations, the feature metric values that are determined may be arranged in a plurality of data structures (e.g., arrays). For example, to determine the feature metric values, the computation system may generate, in the plurality of data structures, the feature metric values, for the plurality of time periods, based on the set of forecasted values. The plurality of data structures may be respectively representative of the plurality of feature metrics. For example, feature metric values, for the plurality of time periods, for a first feature metric (e.g., an attrition metric) may be arranged in a first data structure, feature metric values, for the plurality of time periods, for a second feature metric (e.g., a costs metric) may be arranged in a second data structure, and so forth. The data structures may be configured to store a single data type (e.g., a data type may indicate the type and/or the format of data that is allowable, such as a character data type, a numerical data type, a binary data type, a date and time data type, or the like), and the single data type may be numerical. That is, the data structures may be configured to store only numerical data (e.g., the data structures may be Python NumPy arrays, which may also improve readability of function definitions to thereby facilitate customization). In some implementations, a length (e.g., a quantity of data elements) of each data structure (e.g., array) may correspond to a quantity of time periods of the plurality of time periods. In some implementations, the data structures may be multidimensional arrays. In some implementations, the data structures may be stored at one continuous location in a memory of the computation system, thereby improving a speed and an efficiency at which the data structures can be accessed and manipulated.

As described herein, function definitions for computation of the plurality of feature metrics may be in the second code module. In some implementations, the function definitions for computation of the plurality of feature metrics may be in respective code files in the second code module (e.g., in respective code modules within the second code module). For example, a function definition for computation of a first feature metric may be in a first code file (e.g., attrition.py), a function definition for computation of a second feature metric may be in a second code file (e.g., costs.py), and so forth. A function definition for computation of a feature metric may include a formula used to compute feature metric values for the feature metric (e.g., based on one or more forecasted values of the set of forecasted values, one or more feature metric values for one or more other feature metrics, and/or information associated with an account). Thus, to generate the feature metric values for an account, the computation system may determine the feature metric values, for the plurality of feature metrics, using respective functions for the plurality of feature metrics and based on the set of forecasted values and information associated with the account (e.g., a current balance of the account, a starting balance of the account, an average deposit to the account, and/or an average withdrawal from the account, among other examples).

The computation system may determine the feature metric values respectively (e.g., sequentially) for each account that is to be analyzed. For example, in a manner as described above, the computation system may determine first feature metric values for a first account that is to be analyzed, may then determine second feature metric values for a second account that is to be analyzed, and so forth. Thus, for each account that is to be analyzed, the computation system may arrange the feature metric values determined for that account in data structures respectively representative of the plurality of feature metrics, as described herein.

Figure 1D:
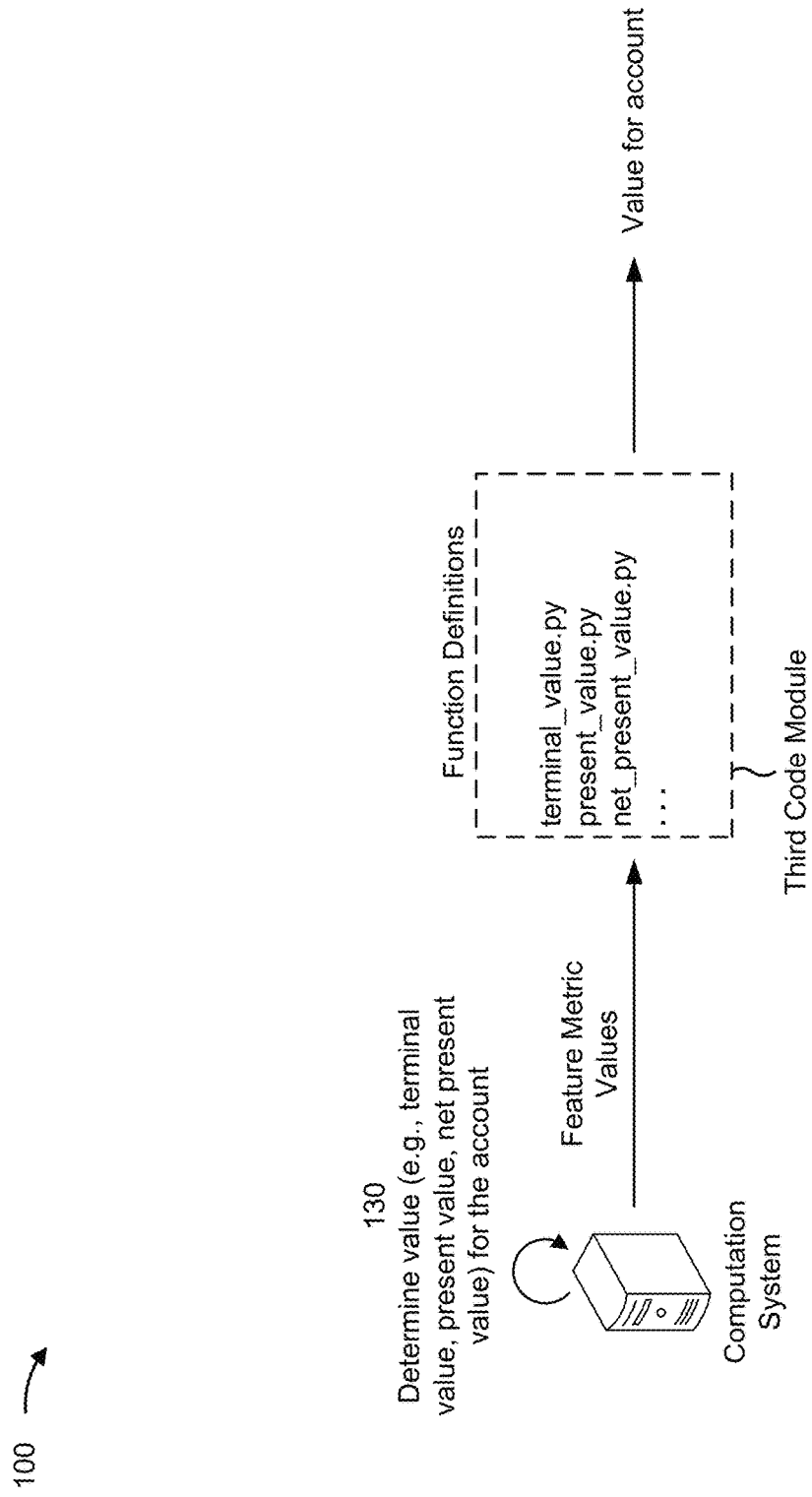

As shown in FIG. 1D, and by reference number 130, the computation system may determine one or more values for the account(s) using the feature metric values for the plurality of feature metrics. For example, the computation system may determine the one or more values for an account using the feature metric values determined for that account. That is, the computation system may determine, respectively for each account that is to be analyzed, one or more values using the feature metric values associated with that account. The one or more values for an account may be a present/future value metric for the account (e.g., for a balance of the account). For example, the one or more values for an account may be a terminal value of the account, a present value of the account, and/or an NPV of the account, among other examples. In some implementations, prior to determining the one or more values, the computation system may convert the feature metric values in the data structures to one or more associative arrays (e.g., one or more Python dictionaries) for use in determining the one or more values, thereby facilitating efficient data retrieval from the feature metric values (e.g., using efficient key-value lookups).

As described herein, function definitions for computation of the one or more values may be in the third code module. In some implementations, the function definitions for computation of the one or more values may be in respective code files in the third code module (e.g., in respective code modules within the third code module). For example, a function definition for computation of a first value may be in a first code file (e.g., terminal value.py), a function definition for computation of a second value may be in a second code file (e.g., present value.py), and so forth. A function definition for computation of a value may include a formula used to compute the value based on one or more feature metric values for one or more feature metrics.

In some implementations, the computation system may perform computation of values for a plurality of accounts using batch processing. Additionally, or alternatively, the computation system may perform computation of values for a plurality of accounts using multi-processing, thereby further reducing a runtime of the computation.

Figure 1E:
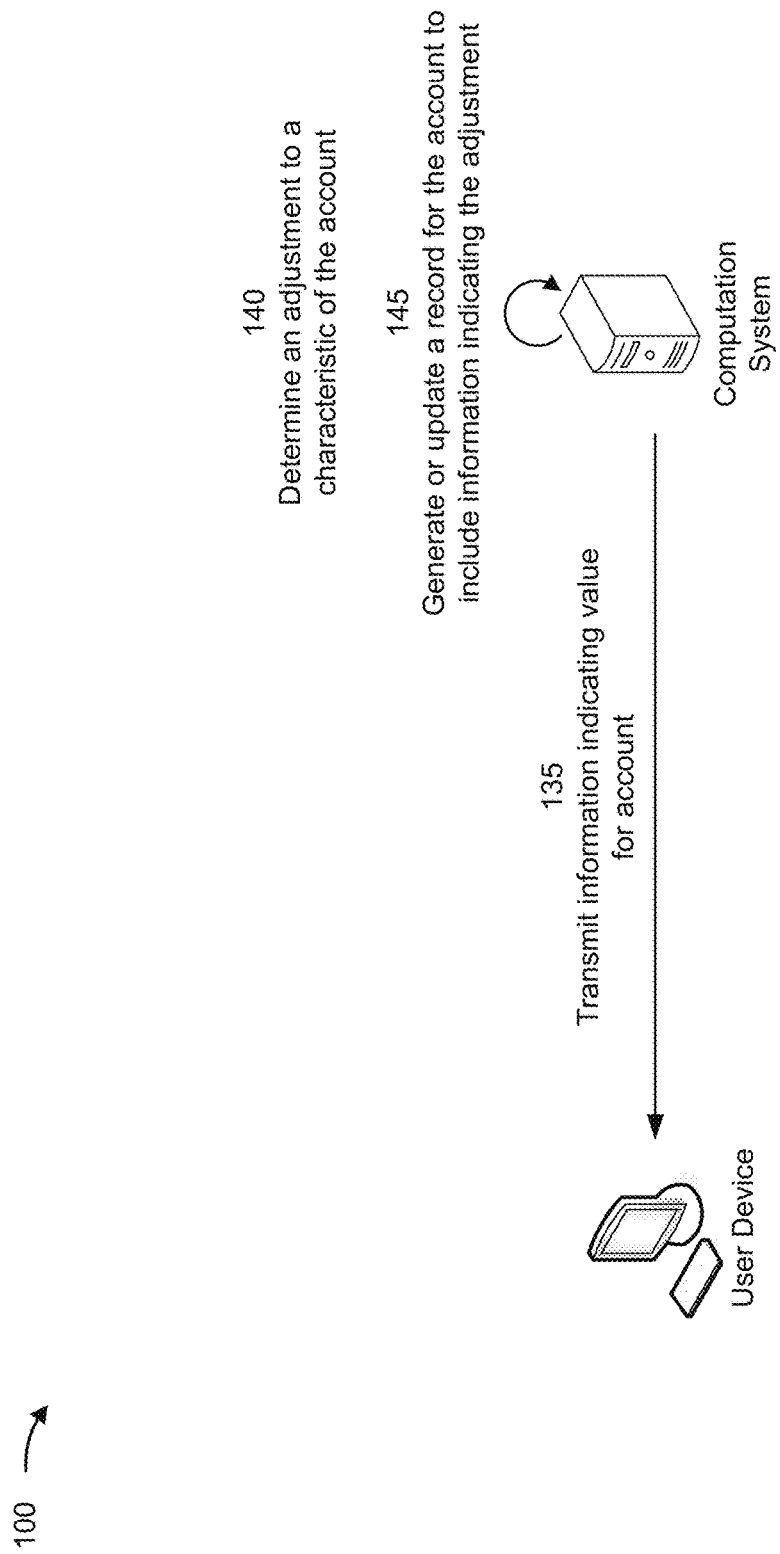

As shown in FIG. 1E, and by reference number 135, the computation system may transmit (e.g., to the user device) information indicating the value(s) determined for the account. In some implementations, the information may further indicate account information associated with the account(s) analyzed and/or the feature metric values, among other examples. In some implementations, the information may include instructions for displaying data (e.g., the value (s), the account information, and/or the feature metric values) included in the information. The information, received at the user device, may cause the user device to present, in a graphical user interface, the information (e.g., the data included in the information).

In some implementations, the computation system may cause the information (e.g., the data included in the information) to be stored to a data lake, to cloud-based data storage, or the like. In some implementations, the computation system may generate one or more reports based on the value(s), and the computation system may transmit the report(s) (e.g., to the user device). The reports may indicate aggregate data (e.g., aggregate present/future value metrics) for a plurality of accounts (e.g., segmented by account type, or the like), recommended actions for one or more accounts (e.g., adjusting an interest rate, as described below), analysis (e.g., ad hoc analysis), or the like.

As shown by reference number 140, the computation system may determine an adjustment to a characteristic of an account based on the one or more values determined for the account. The characteristic may be an interest rate (e.g., an interest rate charged to the account or an interest rate paid to the account), a minimum balance requirement for the account, a minimum monthly deposit amount for the account, or the like. For example, if an NPV determined for the account is below a threshold, then the computation system may determine that an interest rate charged to the account is to be increased, an interest rate paid to the account is to be decreased, a minimum balance requirement for the account is to be increased, a minimum monthly deposit amount for the account is to be increased, or the like. Similarly, if an NPV determined for the account is equal to or above the threshold, then the computation system may determine that an interest rate charged to the account is to be decreased, an interest rate paid to the account is to be increased, a minimum balance requirement for the account is to be decreased, a minimum monthly deposit amount for the account is to be decreased, or the like.

As shown by reference number 145, the computation system may generate or update a record, for the account associated with the adjusted characteristic, that includes the information indicating the adjustment to the characteristic. For example, the record may be generated or updated to indicate the adjusted interest rate, minimum balance requirement, minimum monthly deposit amount, or the like.

Generating or updating the record may cause one or more actions to be performed (e.g., the computation system may perform or cause another device to perform the one or more actions). Additionally, or alternatively, the one or more actions may be performed based on the determination of the adjustment to the characteristic (e.g., the computation system may perform or cause another device to perform the one or more actions). An action may include transmitting (e.g., to a device of a user associated with the account) a notification indicating the adjustment to the characteristic. Additionally, or alternatively, an action may include transferring funds to or from the account based on the adjustment to the characteristic (e.g., funds may be transferred to or from the account to meet a new minimum balance requirement or minimum monthly deposit amount). Additionally, or alternatively, an action may include transmitting (e.g., to a device of a user associated with the account) a notification (e.g., a statement) indicating an obligation associated with the account based on the adjustment to the characteristic (e.g., the notification may indicate a payment that is due, and the payment amount may be based on a new interest rate).

In this way, the computation system may perform computation of present/future value metrics with improved speed and scale, while facilitating customization and portability across numerous applications. In particular, the code architecture implemented by the computation system facilitates customization of data segmentation, function definitions (e.g., formulas), and/or machine learning models used in connection with forecasted values, feature metric values, and/or present/future value metrics, thereby providing portability of the computation system for various applications. Moreover, by modularization of the code, customizations to code in one module may not necessitate customizations to code in another module or affect the code in the other module, thereby improving a stability and error tolerance of the computation system. Furthermore, the modularization of the code, as well as the use of particular data structures to handle data generated by the computation system, improves the runtime and scalability of the computation system. In particular, the computation system may be capable of fast processing of thousands or millions of accounts. For example, the computation system may be capable of processing a single account in less than one second (e.g., about 0.37 seconds per account), thereby enabling real-time use of the computation system.

As indicated above, FIGS. 1A-1E are provided as an example. Other examples may differ from what is described with regard to FIGS. 1A-1E.

Figure 2:
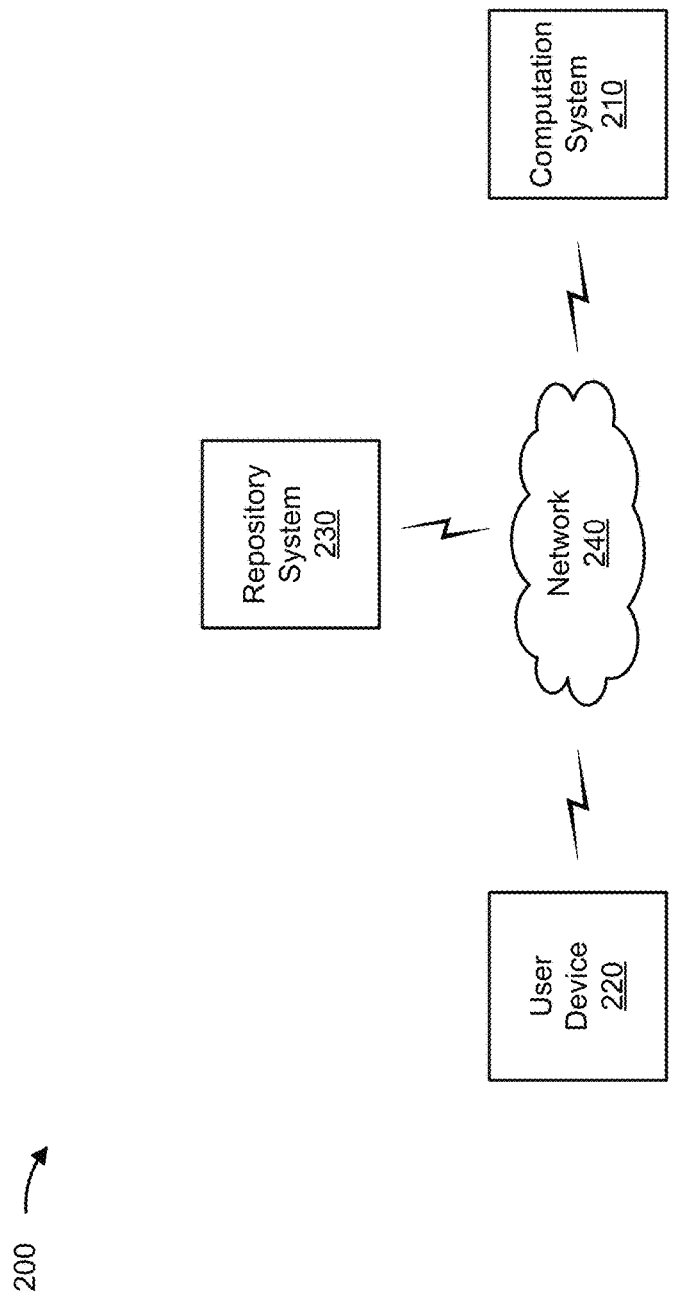
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a computation system 210, a user device 220, a repository system 230, and a network 240. Devices of environment 200 may interconnect via wired connections, wireless connections, or a combination of wired and wireless connections.

The computation system 210 may include one or more devices capable of receiving, generating, storing, processing, providing, and/or routing information associated with computation using a modularized code architecture, as described elsewhere herein. The computation system 210 may include a communication device and/or a computing device. For example, the computation system 210 may include a server, such as an application server, a client server, a web server, a database server, a host server, a proxy server, a virtual server (e.g., executing on computing hardware), or a server in a cloud computing system. In some implementations, the computation system 210 may include computing hardware used in a cloud computing environment.

The user device 220 may include one or more devices capable of receiving, generating, storing, processing, and/or providing information associated with computation using a modularized code architecture, as described elsewhere herein. The user device 220 may include a communication device and/or a computing device. For example, the user device 220 may include a wireless communication device, a mobile phone, a user equipment, a laptop computer, a tablet computer, a desktop computer, a wearable communication device (e.g., a head mounted display, or a virtual reality headset), or a similar type of device.

The repository system 230 may include one or more devices capable of receiving, generating, storing, processing, and/or providing information associated with computation using a modularized code architecture, as described elsewhere herein. The repository system 230 may include a communication device and/or a computing device. For example, the repository system 230 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the repository system 230 may store one or more code modules, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
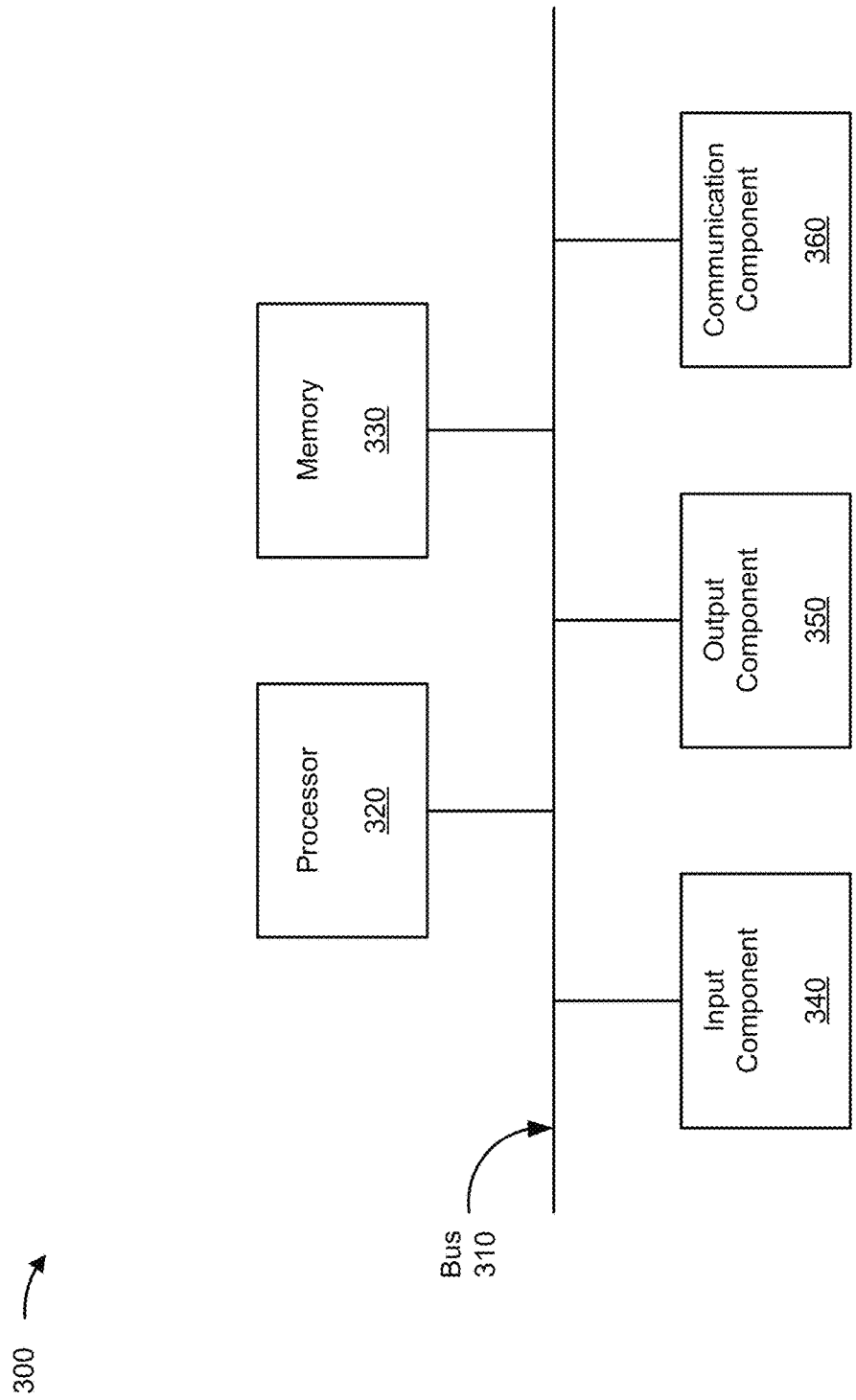
FIG. 3 is a diagram of example components of a device associated with computation using a modularized code architecture, in accordance with some embodiments of the present disclosure.

FIG. 3 is a diagram of example components of a device 300 associated with computation using a modularized code architecture. The device 300 may correspond to computation system 210, user device 220, and/or repository system 230. In some implementations, computation system 210, user device 220, and/or repository system 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
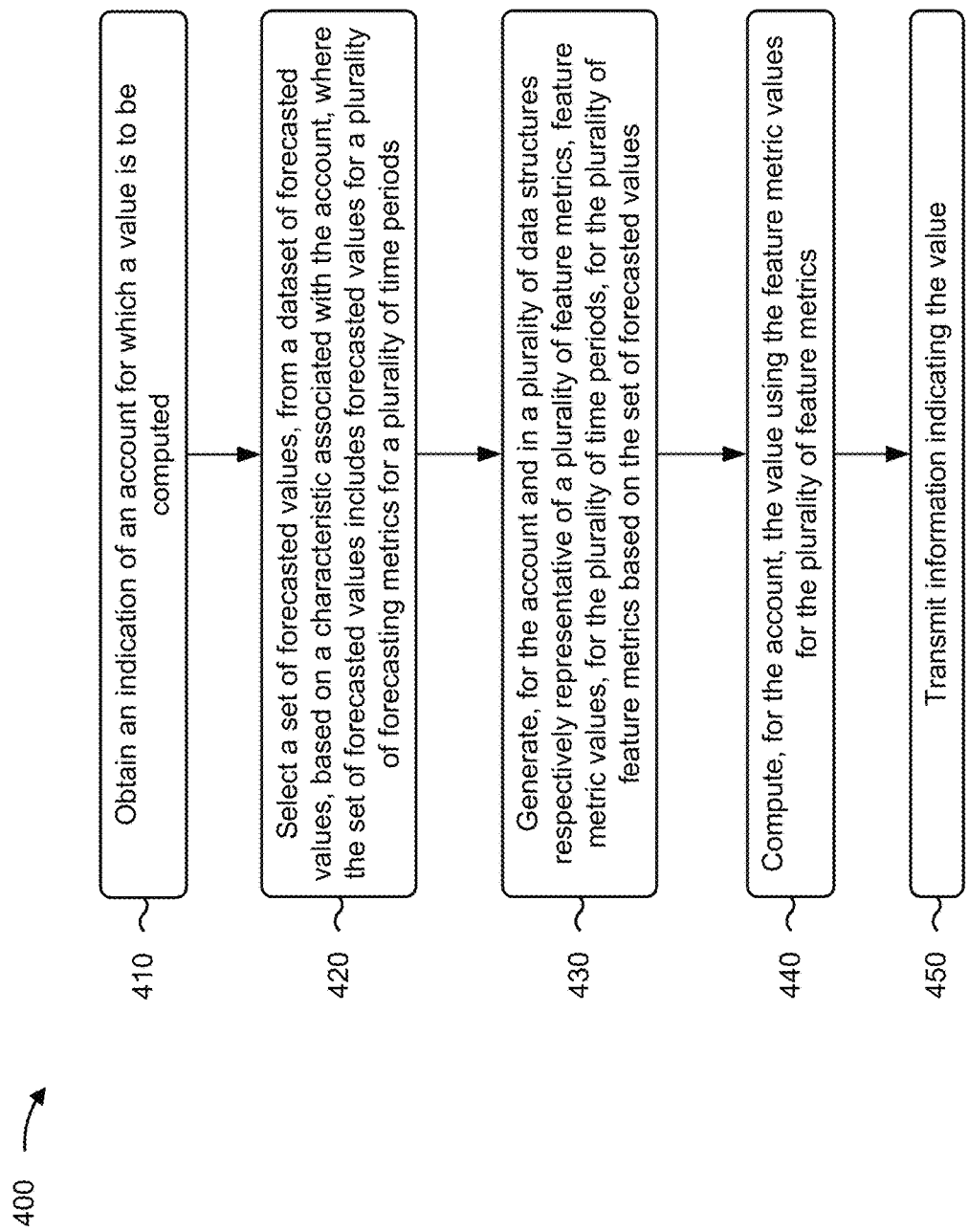
FIG. 4 is a flowchart of an example process associated with computation using a modularized code architecture, in accordance with some embodiments of the present disclosure.

FIG. 4 is a flowchart of an example process 400 associated with computation using a modularized code architecture. In some implementations, one or more process blocks of FIG. 4 may be performed by the computation system 210. In some implementations, one or more process blocks of FIG. 4 may be performed by another device or a group of devices separate from or including the computation system 210, such as the user device 220 and/or the repository system 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining an indication of an account for which a value is to be computed (block 410). For example, the computation system 210 (e.g., using processor 320 and/or memory 330) may obtain an indication of an account for which a value is to be computed, as described above in connection with reference number 115 of FIG. 1A. As an example, the input may indicate one or more account numbers that identify one or more accounts and/or may indicate a type of account (e.g., checking accounts, savings accounts, or the like) that identifies one or more accounts (e.g., that are associated with the type of account that is indicated).

As further shown in FIG. 4, process 400 may include selecting a set of forecasted values, from a dataset of forecasted values, based on a characteristic associated with the account, where the set of forecasted values includes forecasted values for a plurality of forecasting metrics for a plurality of time periods (block 420). For example, the computation system 210 (e.g., using processor 320 and/or memory 330) may select a set of forecasted values, from a dataset of forecasted values, based on a characteristic associated with the account, where the set of forecasted values includes forecasted values for a plurality of forecasting metrics for a plurality of time periods, as described above in connection with reference number 120 of FIG. 1B. As an example, if the accounts indicated by the input are checking accounts, then the selected set of forecasted values may include forecasted values relating to checking accounts. In some implementations, the dataset of forecasted values is in a first code module.

As further shown in FIG. 4, process 400 may include generating, for the account and in a plurality of data structures respectively representative of a plurality of feature metrics, feature metric values, for the plurality of time periods, for the plurality of feature metrics based on the set of forecasted values (block 430). For example, the computation system 210 (e.g., using processor 320 and/or memory 330) may generate, for the account and in a plurality of data structures respectively representative of a plurality of feature metrics, feature metric values, for the plurality of time periods, for the plurality of feature metrics based on the set of forecasted values, as described above in connection with reference number 125 of FIG. 1C. As an example, feature metric values for each feature metric (e.g., an attrition metric, a balance per open metric, a costs metric, an equity flow metric, a fees metric, and/or a fund transfer pricing metric, among other examples) for an account may be computed using the set of forecasted values. For each feature metric, the computed feature metric values may be stored in a respective data structure (e.g., a Python NumPy array) that represents that feature metric. In some implementations, function definitions for computation of the plurality of feature metrics are in a second code module. In some implementations, the plurality of data structures are configured to store a single data type, and the single data type is numerical.

As further shown in FIG. 4, process 400 may include computing, for the account, the value using the feature metric values for the plurality of feature metrics (block 440). For example, the computation system 210 (e.g., using processor 320 and/or memory 330) may compute, for the account, the value using the feature metric values for the plurality of feature metrics, as described above in connection with reference number 130 of FIG. 1D. As an example, a terminal value, a present value, and/or an NPV for the account may be computed using the feature metric values that were computed. In some implementations, a function definition for computation of the value is in a third code module.

As further shown in FIG. 4, process 400 may include transmitting, to a user device, information indicating the value (block 450). For example, the computation system 210 (e.g., using processor 320, memory 330, and/or communication component 360) may transmit, to a user device, information indicating the value, as described above in connection with reference number 135 of FIG. 1E. As an example, transmission of the information indicating the value may cause the user device to display the information in a user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for computation using a modularized code architecture, the system comprising:
one or more memories; and
one or more processors, communicatively coupled to the one or more memories, configured to:
obtain an indication of an account for which a value is to be computed;
select a set of forecasted values, from a dataset of forecasted values, based on a characteristic associated with the account, wherein the set of forecasted values includes forecasted values for a plurality of forecasting metrics for a plurality of time periods, and wherein the dataset of forecasted values is in a first code module;
generate, for the account and in a plurality of data structures respectively representative of a plurality of feature metrics, feature metric values, for the plurality of time periods, for the plurality of feature metrics based on the set of forecasted values,
wherein the plurality of feature metrics include a balance per open metric or an equity flow metric,
wherein function definitions for computation of the plurality of feature metrics are in a second code module, and
wherein the plurality of data structures are configured to store a single data type, and the single data type is numerical;
compute, for the account, the value using the feature metric values for the plurality of feature metrics, wherein a function definition for computation of the value is in a third code module; and
transmit, to a user device, information indicating the value.

2. The system of claim 1, wherein function definitions for obtaining one set of forecasted values from the dataset of forecasted values are in a fourth code module.

3. The system of claim 1, wherein the first code module, the second code module, and the third code module are included in a main code module, and
wherein the one or more processors are further configured to:
cause generation of a fork or a clone of the main code module in which code of at least one of the first code module, the second code module, or the third code module is customizable.

4. The system of claim 1, wherein each of the function definitions for computation of the plurality of feature metrics are in respective code files in the second code module.

5. The system of claim 1, wherein the characteristic is at least one of an account type associated with the account or a management type associated with the account.

6. The system of claim 1, wherein the set of forecasted values is applicable to any account associated with the characteristic.

7. The system of claim 1, wherein the one or more processors are further configured to:
determine an interest rate for the account based on the value; and
generate or update a record for the account to include information indicating the interest rate.

8. The system of claim 1, wherein the first code module includes respective data files for the plurality of forecasting metrics, and
wherein the forecasted values, of the set of forecasted values, are from the respective data files.

9. A method of computation using a modularized code architecture, comprising:
obtaining, by a device from a first code module, a set of forecasted values based on a characteristic associated with a plurality of accounts, wherein the set of forecasted values includes forecasted values for a plurality of forecasting metrics for a plurality of time periods;
determining, by the device and using function definitions in a second code module, respectively for each account of the plurality of accounts and using the set of forecasted values, feature metric values, for a plurality of feature metrics, for the plurality of time periods,
wherein the plurality of feature metrics include an attrition metric, a balance per open metric, or an equity flow metric;
determining, by the device and using function definitions in a third code module, respectively for each account of the plurality of accounts, at least one value using the feature metric values, for the plurality of feature metrics, associated with that account; and
transmitting, by the device to a user device, information indicating the at least one value that is determined respectively for each account of the plurality of accounts.

10. The method of claim 9, wherein the set of forecasted values are in a first code repository, function definitions for computation of the plurality of feature metrics are in a second code repository, and a function definition for computation of the at least one value is in a third code repository.

11. The method of claim 9, wherein the at least one value is at least one of a terminal value, a present value, or a net present value.

12. The method of claim 9, wherein the feature metric values that are determined, respectively for each account of the plurality of accounts, are arranged in a plurality of data structures, respectively representative of the plurality of feature metrics, that are configured to store only numerical data.

13. The method of claim 9, wherein the characteristic is at least one of an account type associated with the plurality of accounts or a management type associated with the plurality of accounts.

14. The method of claim 9, further comprising:
obtaining an input of an update to at least one of the set of forecasted values, function definitions for computation of the plurality of feature metrics, or a function definition for computation of the at least one value.

15. A non-transitory computer-readable medium storing a set of instructions, the set of instructions comprising:
one or more instructions that, when executed by one or more processors of a device, cause the device to:
obtain, based on a characteristic associated with an account, a set of forecasted values from a dataset of forecasted values, wherein the set of forecasted values includes forecasted values for a plurality of forecasting metrics for a plurality of time periods;
generate, for the account, feature metric values, for the plurality of time periods, for a plurality of feature metrics based on the set of forecasted values,
wherein the plurality of feature metrics include an attrition metric, a balance per open metric, and an equity flow metric; and compute, for the account, at least one present or future value metric based on the feature metric values for the plurality of feature metrics.

16. The non-transitory computer-readable medium of claim 15, wherein the one or more instructions, that cause the device to generate the feature metric values for the plurality of feature metrics, cause the device to:
generate, for the account and in a plurality of data structures respectively representative of the plurality of feature metrics, the feature metric values, for the plurality of time periods, for the plurality of feature metrics based on the set of forecasted values,
wherein the plurality of data structures are configured to store only numerical data.

17. The non-transitory computer-readable medium of claim 15, wherein the dataset of forecasted values is in a tabular structure.

18. The non-transitory computer-readable medium of claim 15, wherein the one or more instructions further cause the device to:
determine an adjustment to a characteristic associated with the account based on the at least one present or future value metric; and
generate or update a record for the account to include information indicating the adjustment.

19. The non-transitory computer-readable medium of claim 15, wherein the set of forecasted values is applicable to any account associated with the characteristic.

20. The non-transitory computer-readable medium of claim 15, wherein the at least one present or future value metric is at least one of a terminal value, a present value, or a net present value.

* * * * *